June 18, 1957  G. W. CARR  2,796,165
AUTOMATIC GARMENT CONVEYOR
Filed Oct. 14, 1954  6 Sheets-Sheet 1
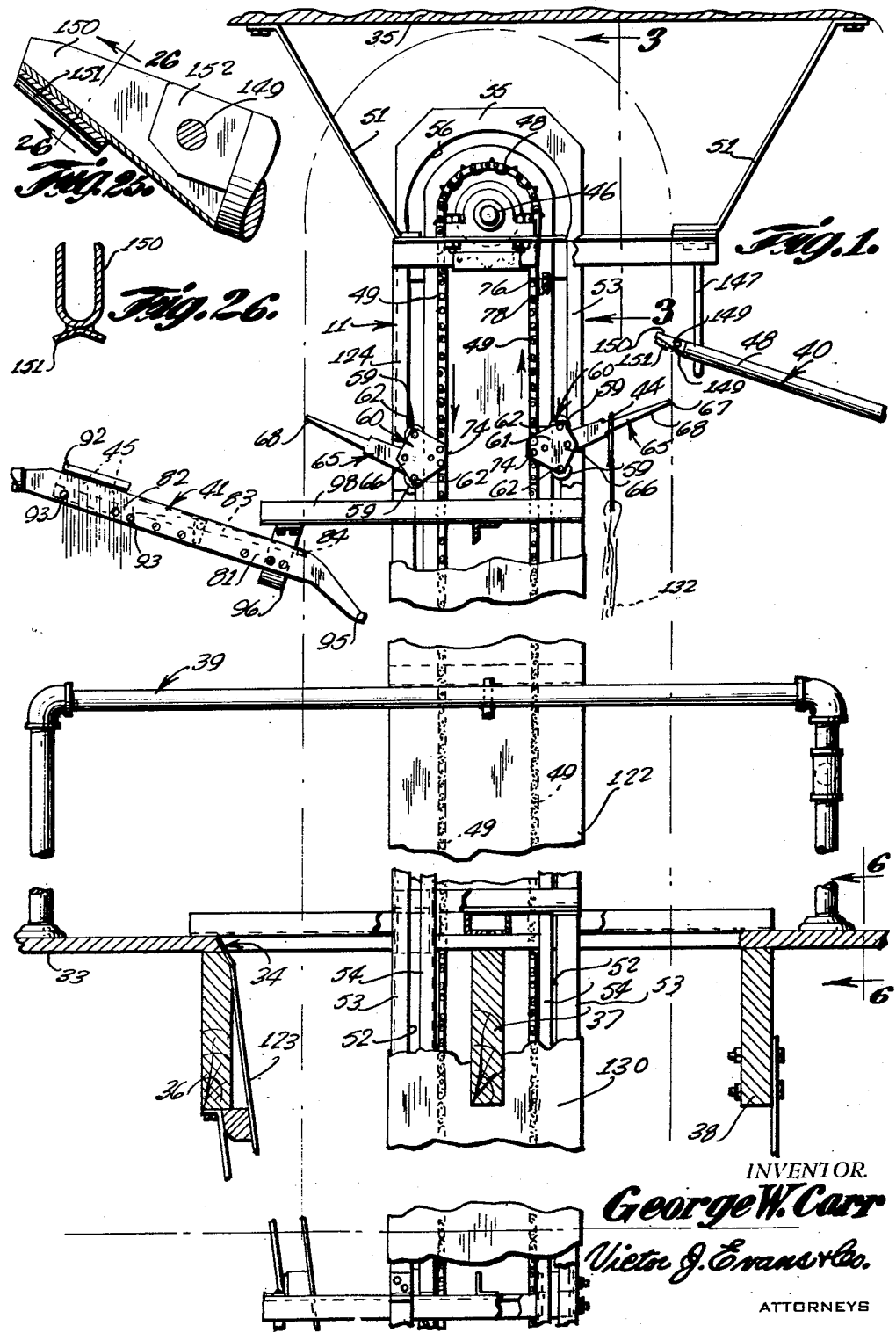
INVENTOR.
George W. Carr
Victor J. Evans & Co.
ATTORNEYS

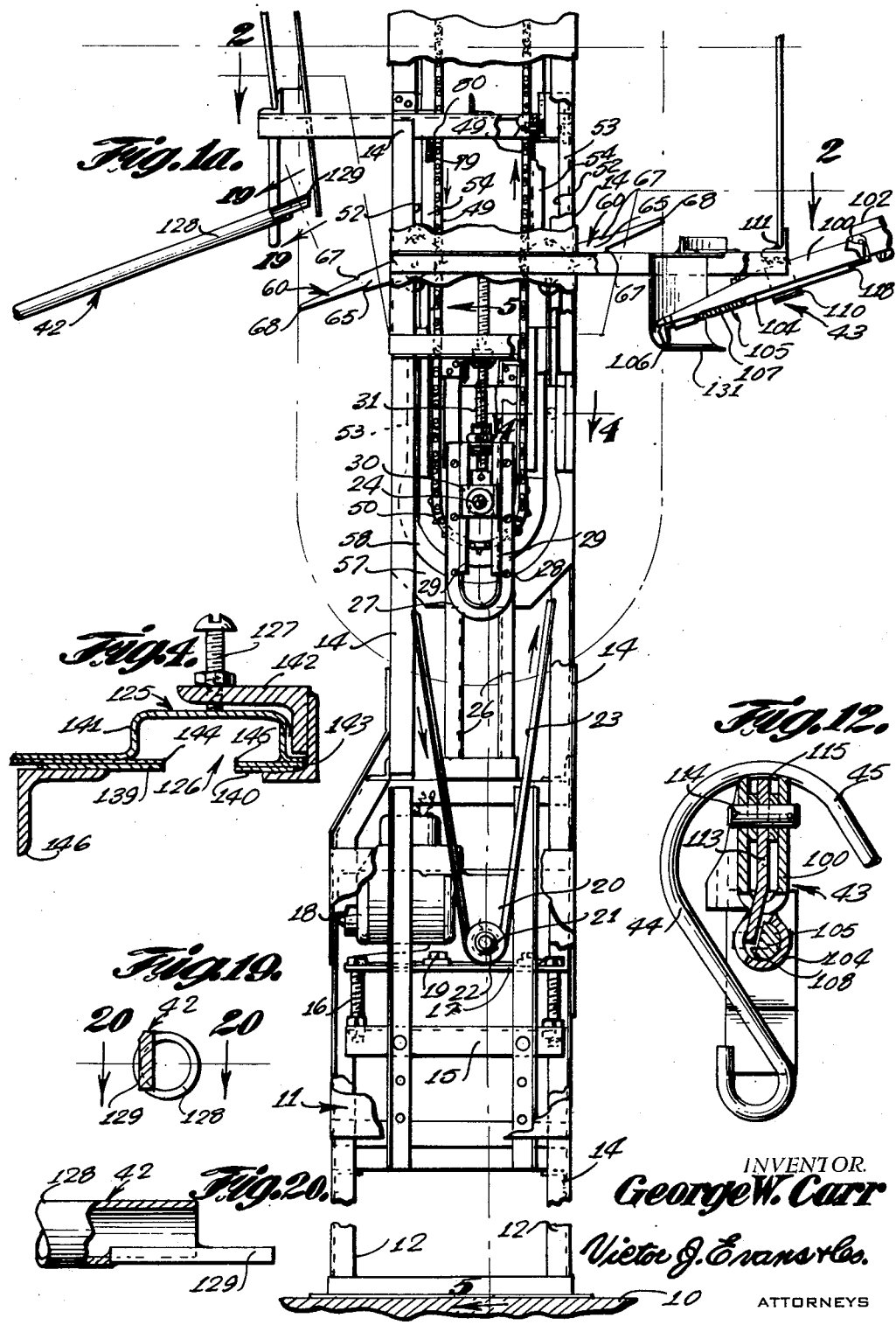

June 18, 1957 G. W. CARR 2,796,165
AUTOMATIC GARMENT CONVEYOR
Filed Oct. 14, 1954 6 Sheets-Sheet 3
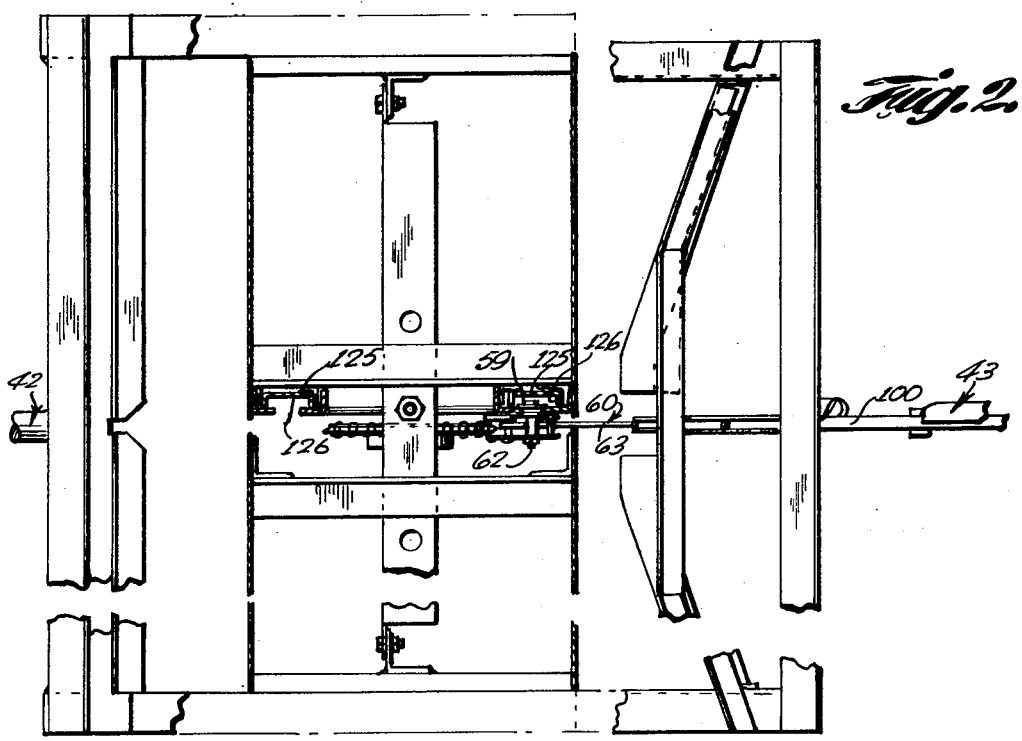
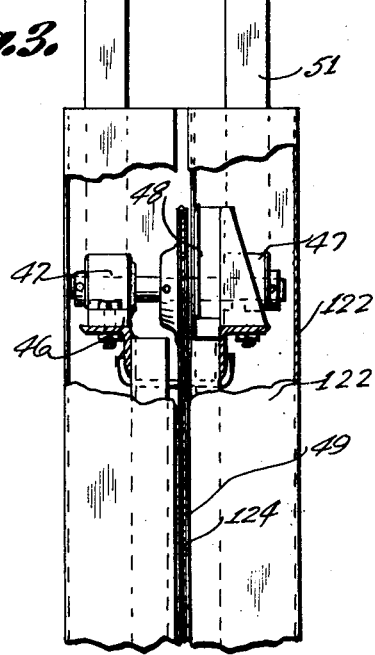
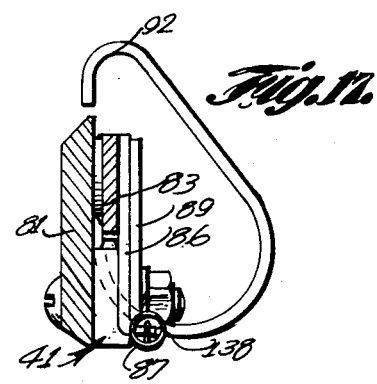
INVENTOR.
George W. Carr
BY Victor J. Evans & Co.
ATTORNEYS

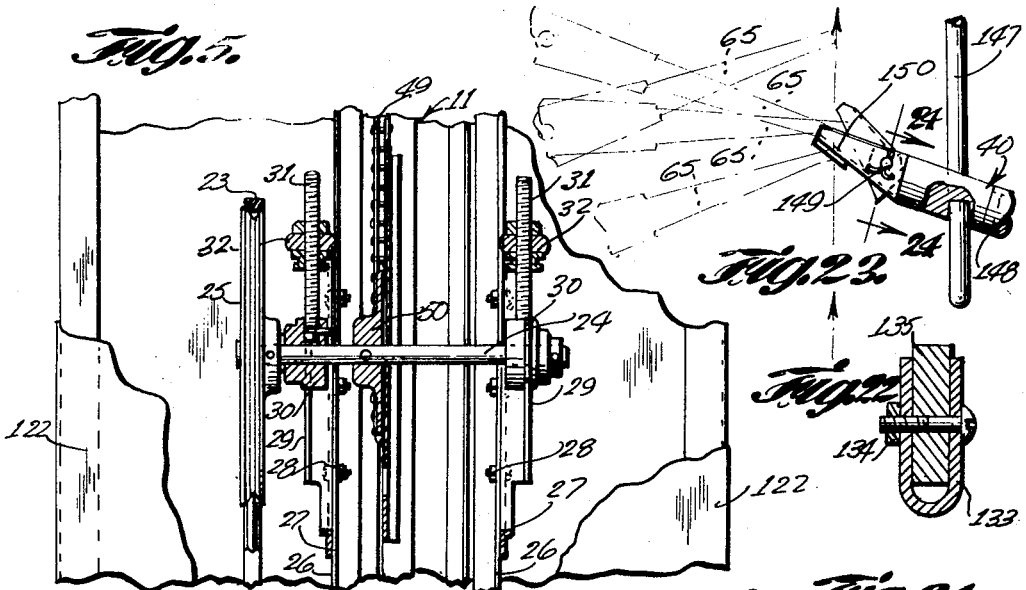
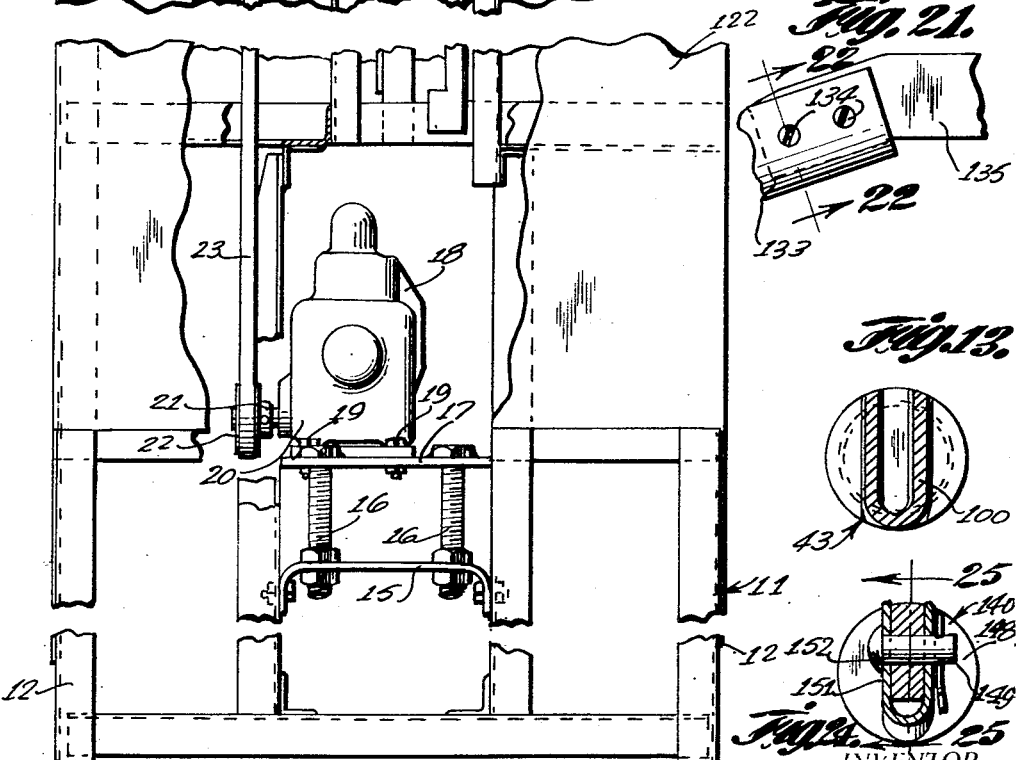

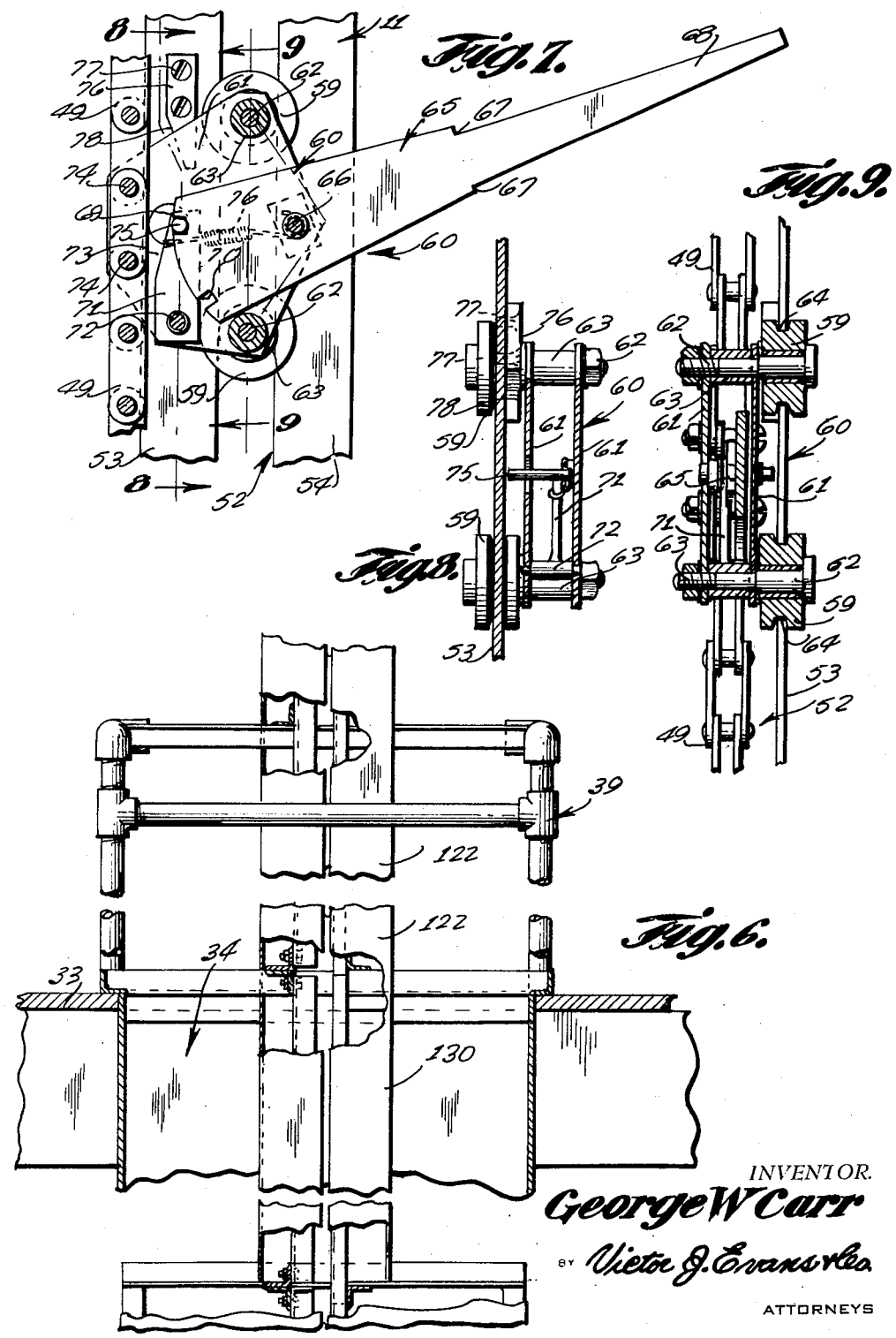

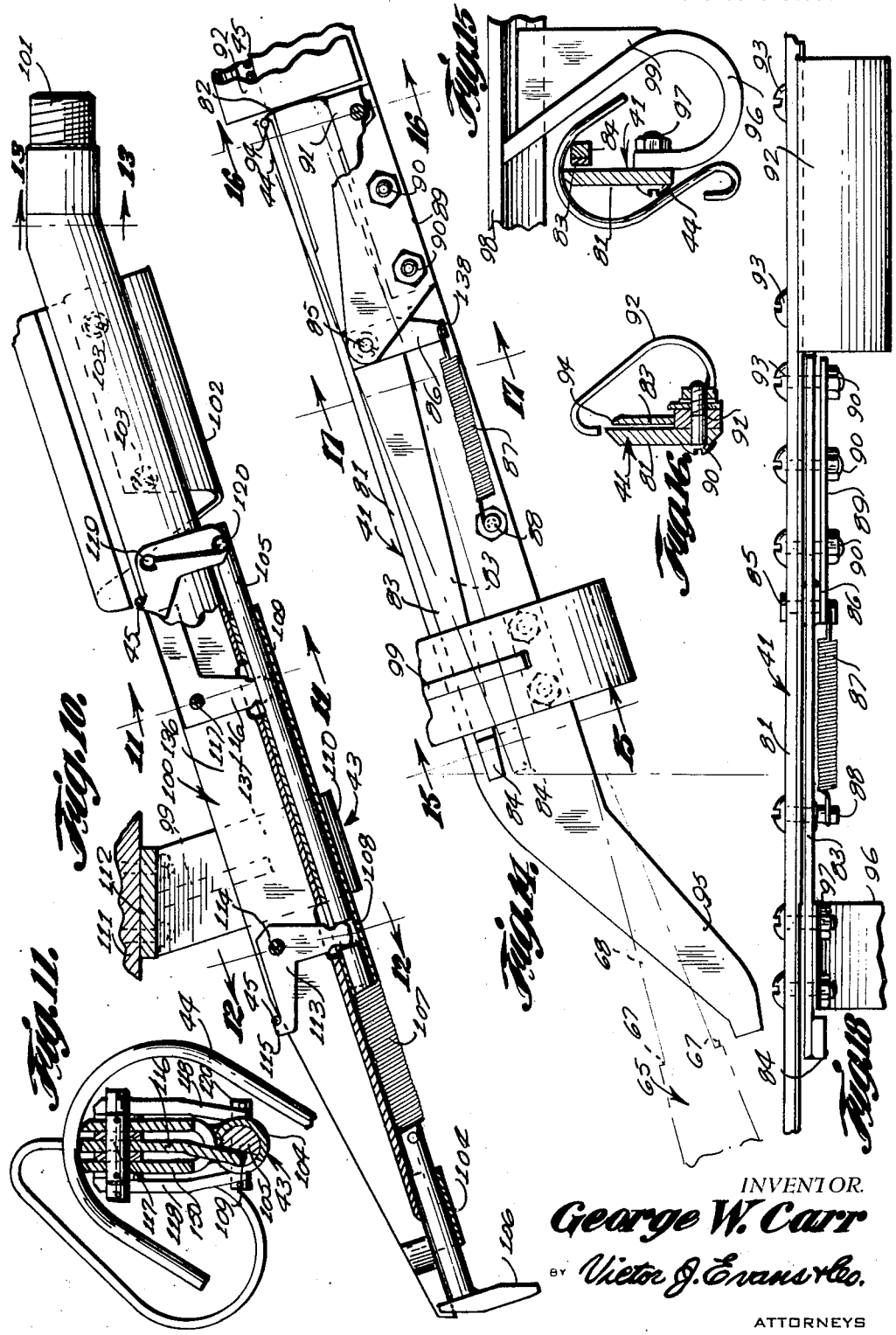

United States Patent Office 2,796,165
Patented June 18, 1957

2,796,165

AUTOMATIC GARMENT CONVEYOR

George William Carr, Fort William, Ontario, Canada

Application October 14, 1954, Serial No. 462,335

1 Claim. (Cl. 198—26)

This invention relates to a conveyor, and more particularly to an automatic conveyor for carrying any article or articles that may be hung on a hook.

The object of the invention is to provide an automatic article hanger conveyor which will convey hangers or hooks vertically wherein such hangers may have any suitable articles thereon, such as garments so that the articles may be moved for example from a lower room to an upper room and simultaneously from an upper room to a lower room.

Another object of the invention is to provide a conveyor system which may be used in any suitable locality as for example in a dry cleaning establishment, a clothing store, factory or the like whereby the conveyor includes a frame that has a motor arranged therein, the motor serving to actuate a conveyor which serves to move vertically a plurality of carriers which are adapted to selectively receive article hangers and wherein the hangers will be automatically discharged from the carriers at selected intervals along the system.

A still further object of the invention is to provide an automatic hanger conveyor which is constructed so that the hangers having garments or other articles thereon can be moved from one area to another as for example from a lower room to an upper room and from an upper room to a lower room without requiring the use of any attendants or effort on the part of operators, and wherein the articles being conveyed will not be damaged during transit.

A still further object of the invention is to provide a conveyor wherein garments or other articles on hangers may be picked up automatically from a rail on a lower floor and then carried up and dispensed or disposed on an upper floor and wherein at the same time articles will be taken off a rail on the upper floor, carried down and disposed on rails on a lower floor, the aforementioned steps being accomplished automatically and wherein the articles can be carried upwardly at the same time that other articles are being brought downwardly so that idle movements of the conveyor are minimized.

A further object of the invention is to provide an automatic article hanger conveyor which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view showing the upper part of the conveyor, and with parts broken away and in section.

Figure 1a is a view similar to Figure 1, with parts broken away and in section, but showing the lower portion of the conveyor, the view shown in Figure 1a being a continuation of the bottom of the view shown in Figure 1.

Figure 2 is a sectional view taken on the line 2—2 of Figure 1a.

Figure 3 is a sectional view taken on the line 3—3 of Figure 1.

Figure 4 is a sectional view taken on the line 4—4 of Figure 1a.

Figure 5 is a sectional view taken on the line 5—5 of Figure 1a.

Figure 6 is a sectional view taken on the line 6—6 of Figure 1.

Figure 7 is a side elevational view showing of the carriers, and with parts broken away and in section.

Figure 8 is a sectional view taken on the line 8—8 of Figure 7.

Figure 9 is a sectional view taken on the line 9—9 of Figure 7.

Figure 10 is a side elevational view of one of the hanger dispensers, with parts broken away and in section.

Figure 11 is a sectional view taken on the line 11—11 of Figure 10.

Figure 12 is a sectional view taken on the line 12—12 of Figure 10.

Figure 13 is a sectional view taken on the line 13—13 of Figure 10.

Figure 14 is a side elevational view, with parts broken away, showing the other hanger dispenser.

Figure 15 is a sectional view taken on the line 15—15 of Figure 14.

Figure 16 is a sectional view taken on the line 16—16 of Figure 14.

Figure 17 is a sectional view taken on the line 17—17 of Figure 14.

Figure 18 is a plan view of the dispenser shown in Figure 14.

Figure 19 is a sectional view taken on the line 19—19 of Figure 1a.

Figure 20 is a sectional view taken on the line 20—20 of Figure 19.

Figure 21 is a fragmentary elevational view illustrating a modified mounting.

Figure 22 is a sectional view taken on the line 22—22 of Figure 21.

Figure 23 is a fragmentary elevational view of one of the receiving rails.

Figure 24 is a sectional view taken on the line 24—24 of Figure 23.

Figure 25 is a sectional view taken on the line 25—25 of Figure 24.

Figure 26 is a sectional view taken on the line 26—26 of Figure 25.

Referring in detail to the drawings, the numeral 10 designates a floor or support which for example may be the first floor of a factory, store, or the like. Extending upwardly from the floor 10 and secured thereto in any suitable manner is a framework 11 which may be made of any suitable material such as angle iron. The frame 11 includes a plurality of vertically disposed beams 12 which may be interconnected by suitable braces, and extending upwardly from the frame 11 and formed integral therewith or secured thereto is a plurality of spaced parallel vertically disposed legs 14.

Positioned within the frame 11 and secured thereto is a bracket 15 which may have a substantially U-shape, and extending upwardly from the bracket 15 is a plurality of securing elements 16 which may be exteriorly threaded bolts. A horizontally disposed platform 17 is connected to the upper ends of the securing elements 16, so that by adjusting the bolts 16 the platform 17 can be leveled as desired. Supported on the platform 17 is a conventional electric motor 18 which may be connected to a suitable source of electrical energy by means of a conductor, and the motor 18 may have its base secured to the platform 17 by bolt and nut assemblies 19, Figures 1a and 5. Arranged contiguous to the motor 18 is a gear box 20, and extending from the gear box 20 is a motor shaft 21 which has a pulley 22 mounted thereon. An endless belt 23 is trained over the pulley 22, and the belt 23 is also trained over a large pulley 25 which is mounted on an upper horizontally disposed drive shaft 24, Figure 5.

Secured within the frame are pairs of vertically disposed posts 26 which may be made of angle iron, and a substantially U-shaped yoke 27 is secured to each pair of angle irons 26 in any suitable manner, as for example by means of bolt and nut assemblies 28, Figures 1a and 5. Each of the yokes 27 is provided with a pair of opposed guide portions 29 which serve to slidably engage adjustable bearing blocks 30. Screw members 31 are arranged in engagement with each of the bearing blocks 30 so that by adjusting the screw members 31, the shaft 24 can be adjusted vertically whereby tension on the belt 23 and on an endless chain of the conveyor, can be regulated as desired. Locking members 32 are arranged in engagement with the screw members 31.

The numeral 33 designates a second floor of a building, Figure 1, and the second floor 33 is arranged in spaced parallel relation above the first floor 10. The floor 33 is provided with a cutout 34 through which projects the vertically disposed conveyor of the present invention, and the numeral 35 designates a portion of the ceiling arranged above the second floor 33. Floor joists 36, 37 and 38 are positioned below the floor 33. For insuring that a person will not accidentally bump into the conveyor, guard rails 39 extend upwardly from the floor 33 and are secured thereto, and the guard rails 39 extend around the opening 34 and around the conveyor.

The numeral 40 designates a receiving member which is adapted to receive hooks 44 that may have garment hangers of conventional construction thereon, and such hangers may be made of wire. The hook receiver 40 is arranged above the second floor 33, and arranged on the opposite side of the conveyor and also positioned above the floor 33 is a hook dispenser 41. Positioned below the floor 33 is a hook receiver 42, and also arranged below the floor 33 is a hook dispenser 43. The numeral 45 designates one of the conventional wire garment hangers. Details of these assemblies will be described later in this application.

Supported by the top of the frame is a horizontally disposed driven shaft 46, the shaft 46 engaging bearings 47. A sprocket 48 is mounted on the shaft 46, and an endless chain 49 is trained over the sprocket 48 and also over a lower sprocket 50 which is mounted on the drive shaft 24. Thus, as the shaft 24 is rotated by means of the previously described belt and pulley arrangement, the endless chain 49 will also be rotated. Braces 51 extend between the top of the frame and the ceiling 35 for maintaining the parts in their proper aligned relation.

Bars 53 and 54 are secured to the frame, and these bars are spaced apart to define slots 52 which provide trackways for a purpose to be later described. Communicating with the trackways 52 are slots 56 in a plate 55 on top of the frame, and there is also provided an arcuate slot 58 in a plate 57 adjacent the lower end of the frame. These slots form trackways for receiving therein grooved wheels or rollers 59 which are journaled on carriers 60.

Each of the carriers 60 has the same construction, and each is connected to the endless chain 49 so that as the chain 49 revolves or moves, the carriers 60 will travel around with the chain so that the hooks 44 are moved past selected stations to pick-up and deposit the hangers which may have garments thereon automatically.

Each of the carriers 60 includes a pair of spaced parallel plates 61 which are secured to the links of the endless chain 49 as by means of securing elements 74. There is provided for each carrier 60 a pair of rollers 59 which are journaled on axles or bolts 62, there being spacers 63 interposed between the pair of plates 61 and mounted on the bolts 62. The numeral 64 designates the annular grooves in the rollers 59 which engage the trackways or slots. Pivotally connected between each pair of plates 61 is a finger 65, this pivotal connection being effected by means of a pivot pin 66. Each finger 65 includes a tapering end portion 68 which defines a pair of shoulders 67, Figure 7. The inner end of each of the fingers 65 includes a pair of cutouts 69 and 70 which are adapted to selectively engage a pin 75. The pin 75 is carried by an ear 71, and the ear 71 is pivotally connected to the carrier by means of a pin 72. Each of the ears 71 is provided with an inclined surface 73 and the purpose of the inclined surface 73 is to clear the chain when the ear 71 moves toward it. A coil spring 76 extends between the pin 66 and the ear 71 for normally urging the ear 71 to the position shown in Figure 7.

A means is provided for selectively causing or permitting pivotal movement of the fingers 65, and this means comprises a first lug 76 which is secured to the frame adjacent the upper end thereof in any suitable manner as for example by means of securing elements 77. The lug 76 includes an inner lower inclined surface 78 which is adapted to be engaged by the pin 75 as the carrier 60 moves up to the lug 76 so that as the pin 75 moves along the inclined surface 78, the finger 65 shown in Figure 7 will swing downwardly in a clockwise direction to permit the hook 44 to slide by gravity down the finger 65 and onto the receiving member 40. The carrier is constructed so that pivotal movement of the finger is assured without additional weight of the hanger or the hanger with the garment.

There is also secured to the frame a second lug 79 which includes an upper inner inclined surface 80, and the lug 79 serves the same purpose as the previously described lug 76. Thus, as the carrier shown in the upper left portion of Figure 1 moves downwardly, the pin 75 will engage the surface 80 to cause the finger 65 shown in the upper left portion of Figure 1 to move to the position shown on the left side of Figure 1a so that a hook thereon will fall by gravity from the downwardly extending finger onto the receiving member 42.

The details of the construction of the hook dispenser 41 are shown in Figures 14–18, wherein the numeral 81 designates a flat bar which has a cutout 82 adjacent its rear upper end which defines a shoulder for temporarily limiting downward movement of the hooks 44. A strip 83 has a tongue 84 secured to its front end, and the strip 83 is pivotally connected to the bar 81, by means of a bolt and nut assembly 85. A strap 86 is secured to the strip 83 in any suitable manner, as for example by welding, and a coil spring 87 has one end connected to the strap 86, while the other end of the spring 87 is arranged in engagement with a bolt and nut assembly 88 which is secured to the bar 81. A plate 89 is secured to the bar 81 by suitable bolt and nut assemblies 90, and the plate 89 helps to guide or maintain the strap 86 and strip 83 in their proper position as they pivot, there being a spacer member 91 interposed between the plate 89 and the bar 81.

A shield 92 is secured to the bar 81 by suitable bolt and nut assemblies 93, and the shield 92 serves to help insure that the hooks will not become accidentally dislodged from their proper place on the rear of the bar 81. A pointed lip 94 is formed on the upper rear end of the strip 83, and the lip 94 is of such a size that only one of the hanger hooks 44 will be engaged by the lip as the strip 83 pivots to cause the hooks to move one at a time by gravity down the bar 81 onto the proper finger 65 of the carrier 60. The lower end of the bar 81 is shaped to provide a guide portion 95 which insures that the hooks will be properly guided onto the moving carriers. For supporting the dispenser 41, a hanger 96 is secured to the bar 81 by suitable bolt and nut assemblies 97, Figure 15, and the hanger 96 may be secured to a support member 98, there being a brace 99 extending between the support member 98 and the hanger 96.

The hook dispenser 43 is shown in detail in Figures 10–13, and includes a U-shaped support member 100 that has a threaded stud 101 on its upper end so that the support member can be attached to a pipe, rail or the like. The support member 100 is inclined so that the hooks 44 have a tendency to move downwardly therealong by gravity, and a shield 102 is secured to the support member 100 by suitable securing elements 103, the shield 102 serving to help prevent the hooks thereon from accidentally moving out of their proper place. Secured below the support member 100 in any suitable manner, as for example by welding is a hollow tube 104 which has a rod or shaft 105 slidably or reciprocably arranged therein. A latch 106 is secured to the front end of the rod 105, and the latch 106 is adapted to be engaged by the projecting end of the fingers 65 as the fingers 65 are moved along. As the fingers 65 engage the latch 106 the rod 105 will be pushed inwardly into the tube 104 to compress a coil spring 107, and as this happens, one of the hooks will be permitted to fall by gravity onto that particular finger so that this hook can be conveyed upwardly. After the finger passes, the coil spring 107 will return the parts to the position shown in Figure 10. The rod 105 is provided with a pair of recesses or cutouts 108 and 109 intermediate its ends.

A hanger 110 is secured to the support member 100 by screws for supporing the dispenser 43, and the hanger 110 may be secured to a suitable supporting structure 111 by securing elements 112. Pivotally mounted between the legs of the U-shaped support member 100 is a first substantially L-shaped lever 113, the lever 113 being pivotally connected to the support member 100 by means of a pin 114. The lever 113 has its lower end projecting into the recess 108 in the rod 105, and a protrusion or projection 115 on the upper end of the lever 113 serves to limit or temporarily hold one of the hooks 44 so that only one hook will be released from the dispenser at a time. A second substantially L-shaped lever 116 is pivotally connected to the support member 100 by means of a pin 117, and the lower end of the lever 116 projects into the cutout 109 in the rod 105. The lever 116 serves to temporarily stop downward movement of a hook which is held up by a pair of coacting links 118. The links 118 are pivotally connected to the support member 100 by a pin 119, and a pin 120 connects the lower ends of the links 118 to the rear end of the rod 105. Retaining members 121 are provided for maintaining the links in their proper assembled position.

The framework of the conveyor may be enclosed by suitable sheet metal covering or plates 122 so that damage to the moving parts will be prevented, and suitable shields or guards can be used wherever desired to prevent accidental entanglement of the moving articles such as the garments with any nearby objects. Thus, shields such as the shield 123 can be used as shown in Figure 1. The enclosure or sheet metal housing 122 may be provided with longitudinally extending slots or cutouts 124 to permit the passage therethrough of the fingers 65. Coacting with the trackways or slots 52 are body members 125, Figure 4, and the body members 125 are provided with offset portions that define passageways or channels 126 that provide enclosures for the moving wheels 59 of the carriers 60. Set screws 127 may be provided for maintaining the body members 125 in their proper positions in the frame. In Figure 4 there is shown certain constructional details of the frame and there is provided two spaced apart plates 144 and 145 which form the trackway 52. These plates may be maintained in their proper spaced apart relation by welding a plate 141 thereto and these plates are shaped to provide clearance for the moving rollers. The member 142 is part of the frame and an angle iron 143, having plate 140 welded thereto, may be secured to the member 142 by means of screws. An angle iron 146 may be secured to the plate 139 as by welding, and the angle iron 146 can be secured to the frame with screws also. Plates 144, 139, 145, and 140 are shaped to provide the trackway and when tension of an endless chain is adjusted, the member 141 can be adjusted and will move together with the shaft 24 and the plates 144 and 145, the plates 144 and 145 sliding on the plates 139 and 140. The screws 127 serve to secure the plate 141 in place so that uninterrupted clearance for the rollers 59 is provided. The hook receiver 42, shown in Figure 1a, is inclined so that the hooks will move downwardly therealong by gravity to any desired location, and a lip 129 projects from the upper end of the receiver 42 for helping to guide or receive the hooks 44 as they are discharged from the fingers 65. The lip 129 may be secured to a pipe-like member 128 that forms part of the receiver 42, Figures 19 and 20. In actual practice the conveyor may be made in substantially three parts which include the upper portion of the conveyor that is arranged above the floor 33, the lower portion of the conveyor which is arranged below the floor 33, and an intermediate or joining part 130 which interconnects the top and bottom of the conveyor together. A shield 131 is arranged contiguous to the discharge member 43, and the shield 131 serves to protect the garments against possibility of being caught by the protruding member 100 or the latch 106. The shield 123 serves the same purpose.

The spacer member 91 serves to limit pivotal movement of the strip 83 in one direction. The spring 87 may be connected to a suitable bent portion 138 on the strap 86. The numeral 132, in Figure 1, indicates a garment which may be a coat, pair of pants, or the like that is arranged in engagement with the hanger 44. The tube 104 positioned below the support member 100 may be made in a plurality of sections which are arranged in alignment with respect to each other.

From the foregoing it is apparent that there has been provided a conveyor which will automatically carry hooks such as the hooks 44 from one location to another. In use the dispenser 41 and the dispenser 43 may be loaded with a plurality of hooks 44 which may have garment hangers such as the garment hangers 45 having garments 132 thereon. Then, upon actuation of the motor 18, the pulley 22 will be rotated to thereby cause the belt 23 to turn the pulley 25 and this in turn will cause rotation of the shaft 24. As the shaft 24 rotates, the endless chain 49 will continually travel, and this movement of the chain 49 will cause movement of the carriers 60 since the carriers 60 have their plates 61 secured to the chain 49 by securing elements 74. As an example of how the conveyor works, starting with the carrier 60 on the right side of Figure 1a, this carrier is arranged so that its finger 65 projects upwardly so that the uppermost shoulder 67 will support a hanger 45 that has been dispensed thereon from the dispenser 43. This carrier 60 will move upwardly to the position shown in Figure 1 on the right hand side, and continued movement of this carrier will cause the pin 75 to ride up on the inclined surface 78 of the lug 76 and when this occurs the ear 71 will be moved since it is pivoted on the pin 72. Thus, the pin 75 will move out of the cutout 69 in the rear of the finger 65 and clockwise pivotal movement of the finger 65 will take place downwardly from the position shown in Figure 7 so that the hooks 44 thereon will fall by gravity onto the receiver 40 whereby it can be conveyed to any suitable location. Then, the carrier 60 on the right side of Figure 1 will continue to travel upwardly and around the sprocket 48 until it occupies the position shown on the left side of Figure 1. Then, this carrier 60 on the left side of Figure 1 will move downwardly until the finger 65 engages the tongue 84 on the strip 83 to thereby cause pivotal movement of the strip 83 so that the lip 94 will lift up one of the hooks 44 from the cutout 82 whereby this hook will fall by gravity down the inclined bar 81 onto the inclined finger 65. It is to be noted that the dispenser 41 and the receiver 40 are arranged above the floor 33. As soon as the finger 65 has passed below the dispenser 41, the coil spring 87 will return the parts to the position shown in solid lines in Figure 14 so that no further hangers will be dispensed. The carrier 60 shown on the left side of Figure 1 will continue its downward movement until it engages the lug 79 and when this occurs the pin 75 will engage the inclined surface 80 on the lug 79 to cause the finger 65 to move from the position shown on the left side of Figure 1 to the position shown on the left side of the frame in Figure 1a so that the finger 65 will move downwardly in a counterclockwise direction whereby the hook will fall by gravity onto the receiver 42. Next, the carrier 60 on the left side of Figure 1a will travel downwardly and come up the right side of Figure 1a until the finger 65 engages the latch 106 and this will cause the rod 105 to move inwardly against the tension of the coil spring 107. This actuation of the rod 105 will result in movement of a single hook from the dispenser 43 onto the rising carrier since inward movement of the rod 105 causes pivotal movement of the lever 113 and also causes pivotal movement of the lever 116 and pivotal movement of links 118. Thus, the pivotal movement of the lever 116 is such that it temporarily stops the hook released by the links 118 until the lever 113 returns to the position shown in Figure 10 in order to form a barrier to further downward movement of the hook. When the finger passes up above the latch 106, the spring 107 will return the parts to the position shown in Figure 10. This cycle is continuously repeated so that hooks are simultaneously conveyed up and down so that for example hooks with hangers having garments thereon may readily be moved from one area or room to a higher area or room and vice versa. The notch or cutout 70 engages the pin 75 when the finger 65 pivots in a clockwise direction, Figure 7, and the lug 79 is the same as the lug 76 except that it is in reversed position.

With the present invention garments on hangers can be picked up from a rail on a lower floor and carried up and disposed on an upper floor and at the same time garments from the rail on an upper floor can be carried down and disposed on rails on the lower floor. Thus, the automatic machine of the present invention will perform the work of two separate machines since it will carry garments up and at the same time will bring other garments down so that idle movements will be eliminated. Further, the assembly occupies a minimum of space.

The conveyor of the present invention will carry anything that can be hung on a hook. As shown in Figures 21 and 22, a modified mounting can be used in lieu of the screw threaded connection 101. Thus, the dispenser 43 may include an upper U-shaped end 133 that can be secured to a bar 135 by suitable securing elements such as the bolt and nut assemblies 134.

The inclined surface 73 permits the ear 71 to clear the chain when the ear moves towards the chain. A shim 136 may be secured inside of the member 100 by suitable screw 137, Figure 10, and the shim 136 serves as a stop to limit forward movement of the lever 116 and also limit forward movement of the rod 105.

Referring to Figure 1 and Figures 23–26, there is shown a mechanism for causing the hooks to move onto the receiving rail 40. Thus, the receiving rail 40 includes a stationary bar 148 that may be supported by a hanger 147. A pin 149 pivotally connects a U-shaped tip 150 to an extension 152 which projects from the end of the bar 148, and a guard member 151 is secured as by welding, to the lower surface of the tip 150. Then, it will be seen that as the finger 65 moves up, it occupies the position shown by the letter A in Figure 23 and in this position it engages the guide member 151 to thereby move or pivot the tip 150 from the solid line position of Figure 23 to the dotted line position so that the tip 150 occupies the position indicated by the letter D. After the finger 65 moves up sufficiently, the tip 150 will drop by gravity to the solid line position and the finger will be released by the lug 76 so that it will occupy the position shown by the letter B. Then, the end of the finger will be supported by the U-shaped tip 150 and continued movement of the carrier causes the finger to occupy a slanting position as indicated by the letter C so that the hanger or hook on the finger will fall by gravity onto the rail 40.

I claim:

In an automatic conveyor, a frame, a bracket mounted within said frame, a plurality of adjustable securing elements extending upwardly from said bracket, a platform connected to the upper end of said securing elements, a motor supported on said platform and adapted to be connected to a source of electrical energy, a first pulley driven by said motor, a plurality of vertically disposed standards arranged in pairs and extending upwardly from said frame, a pair of yokes of substantially U-shaped secured to said standards, a bearing block adjustably connected to each of said yokes, a horizontally disposed drive shaft extending between said pair of bearing blocks, a second pulley mounted on an end of said drive shaft, an endless belt trained over said pulleys, a sprocket mounted on said drive shaft, a driven shaft supported by the top of said frame, a sprocket mounted on said driven shaft, an endless chain trained over said sprockets, a plurality of movable carriers each including a pair of spaced parallel plates secured to said endless chain, a finger pivotally mounted between each pair of plates and including a tapered end portion defining shoulders, said fingers adapted to receive the hooks of garment hangers thereon, the inner end of each of said fingers being provided with a pair of cutouts, an ear pivotally connected to each carrier, a pin carried by said ear for selective engagement with said cutouts, a coil spring connected to said ear, said frame including slots defining trackways, grooved wheels journaled on said plates and engaging said trackways, a first inclined garment hanger hook receiving member, a first lug secured to the upper portion of said frame and including an inclined surface for engagement by the pin or said ear, an inclined garment hanger hook dispenser including a hook supporting bar provided with a lower guide portion, there being a cutout in the upper surface of said bar defining a shoulder for temporarily limiting downward movement of said hooks, a strip pivotally connected to said bar and having a lip on its rear end for lifting said hooks one at a time out of the cutout in said bar, a tongue on the front of said strip for engagement by said fingers, a spring pressed strap connected to said strip, a garment hanger hook receiving member for receiving hooks from said fingers, and a garment hanger hook dispenser including a U-shaped support member, a hollow tube positioned below said support member, a spring pressed rod reciprocably arranged in said tube and provided with a pair of recesses, a first L-shaped lever pivotally connected to said support member and having its lower end projecting into one of said recesses, the upper end of said lever providing a stop for temporarily limiting downward movement of the hooks along said support member, a latch on the outer end of said rod for engagement by said fingers, a pair of links pivotally connected to said support member for temporarily limiting downward movement of the hangers, a second L-shaped lever pivotally connected to said support member and having its lower end seated in a recess in said rod for holding a hook released by said links until said first lever returns to its limiting position, and a second lug for causing pivotal movement of said fingers.

References Cited in the file of this patent

UNITED STATES PATENTS

| | | |
|---|---|---|
| 1,597,929 | Sjolander et al. | Aug. 31, 1926 |
| 2,318,180 | Morse | May 4, 1943 |